United States Patent
Wu

(10) Patent No.: US 7,619,551 B1
(45) Date of Patent: Nov. 17, 2009

(54) AUDIO CODEC, DIGITAL DEVICE AND VOICE PROCESSING METHOD

(75) Inventor: Li-Te Wu, Taipei (TW)

(73) Assignee: Fortemedia, Inc., Cupertino, CA (US)

( * ) Notice: Subject to any disclaimer, the term of this patent is extended or adjusted under 35 U.S.C. 154(b) by 0 days.

(21) Appl. No.: 12/181,481

(22) Filed: Jul. 29, 2008

(51) Int. Cl.
*H03M 3/00* (2006.01)

(52) U.S. Cl. ...................... 341/143; 341/155

(58) Field of Classification Search ............. 341/155, 341/143, 141; 381/80, 81, 123; 704/94
See application file for complete search history.

(56) References Cited

U.S. PATENT DOCUMENTS 7,167,119 B1 * 1/2007 Lei et al. .................... 341/143
7,230,557 B1 * 6/2007 Burk et al. .................. 341/155

\* cited by examiner

*Primary Examiner*—Peguy JeanPierre
(74) *Attorney, Agent, or Firm*—Thomas, Kayden, Horstemeyer & Risley

(57) ABSTRACT

An audio codec is provided, comprising an analog to digital converter (ADC) operable to receive an analog input signal for producing a first digital signal, and a first decimator down samples the first digital signal to generate a first intermediate signal. A second decimator receives a second digital signal from a digital microphone and down sample the second digital signal to generate a second intermediate signal. A multiplexer selects either the first intermediate signal or the second intermediate signal as a selected signal based on a control signal. A third decimator down samples the selected signal to generate a down sampled signal. A data formatter produces a digital output signal based on the down sampled signal.

24 Claims, 3 Drawing Sheets

006
AUDIO CODEC, DIGITAL DEVICE AND VOICE PROCESSING METHOD

BACKGROUND OF THE INVENTION

1. Field of the Invention

The invention relates to audio signal processes, and in particular, to a codec capable of decoding signals from both analog and digital microphones.

2. Description of the Related Art

Recording capability is prevalent in portable consumer products, such as a mobile phone, a portable media player and a Personal Digital Assistant (PDA). FIG. 1 shows a conventional audio codec 100, an essential component of a digital device (not shown) for processing recorded audio signals. A digital microphone 110 is usually embedded inside the digital device to convert input voices into a second digital signal #$D_2$. The digital microphone 110 may be an Electret Condenser Microphone (ECM) that outputs the second digital signal #$D_2$ in a Pulse Density Modulation (PDM) format. Conventionally, the second digital signal #$D_2$ is a one-bit data stream, and its data rate may vary from an application dependent range, such as 1.024 MHz (for an 8 KHz narrow band communication application) or 3.072 MHz. (for a 48 KHz audio recording).

The digital device may also support externally attached analog microphones, such as a hand free microphone or an ear-microphone. Thus, it is desirable to implement an audio codec 100 that supports analog inputs in addition to the second digital signal #$D_2$. As shown in FIG. 1, the analog input signal #$A_{IN}$ represent an analog input converted from input voices. When an analog microphone (not shown) is attached to the digital device, the analog input signal #$A_{IN}$ is sent from the analog microphone to the audio codec 100. An analog to digital converter (ADC) 102 then converts the analog input signal #$A_{IN}$ into a first digital signal #$D_1$ of the same format as the second digital signal #$D_2$. The first digital signal #$D_1$ and second digital signal #$D_2$ are selected by a multiplexer 104 to be an output for a subsequent stage. For example, when the analog microphone is not available, the multiplexer 104 selects only the second digital signal #$D_2$ to be a selected signal #$D_S$, thus a decimation filter 106 can down sample the selected signal #$D_S$ to output a down sampled signal #$D'_S$. Conversely, if the analog microphone is available, the multiplexer 104 may select the first digital signal #$D_1$ to be the selected signal #$D_S$. Next, a data formatter 108 would then convert the selected signal #$D_S$ into a predetermined format and output it as a digital output signal #$D_{OUT}$.

The analog microphone that provides the analog input signal #$A_{IN}$, however, may feature various characteristics such as signal amplitude, interference and quality. The ADC 102 must be specifically implemented to be adapted to different analog microphones. Conventionally, the ADC 102 may be a sigma-delta modulator, and the first digital signal #$D_1$ produced therefrom is a one-bit data stream with varying pulse densities. Technically, a one-bit data stream requires less wire to transfer, thus the cost can be reduced. The disadvantage of the one-bit form, however, is generally known as being an idle tone of significant magnitude. It is therefore desirable to implement a more flexible architecture that improves signal quality and reduces the idle tone effect.

BRIEF SUMMARY OF THE INVENTION

An exemplary embodiment of an audio codec is provided, comprising an analog to digital converter (ADC) operable to receive an analog input signal for producing a first digital signal. A first decimator down samples the first digital signal to generate a first intermediate signal. A second decimator receives a second digital signal from a digital microphone and down sample the second digital signal to generate a second intermediate signal. A multiplexer selects either the first intermediate signal or the second intermediate signal as a selected signal based on a control signal. A third decimator down samples the selected signal to generate a down sampled signal. A data formatter produces a digital output signal based on the down sampled signal.

The audio codec further comprises a controller for providing the control signal based on availability of the analog input signal.

In an embodiment, the ADC is a one-bit delta-sigma modulator that converts the analog input signal into the first digital signal, which is a one-bit Pulse Code Modulation (PCM) data stream of a first clock rate. Alternatively, the ADC may be a multi-bit delta-sigma modulator that converts the analog input signal into the first digital signal, which is a multi-bit PCM data stream of a first clock rate.

The first decimator may be a sinc type decimator that down samples the first digital signal by a first factor to generate the first intermediate signal of a second clock rate. The second digital signal is a one-bit Pulse Density Modulated (PDM) data stream of a third clock rate.

The second decimator may be a sinc type decimator that down samples the second digital signal by a second factor to generate the second intermediate signal of the second clock rate. The third decimator comprises a filter and a down sampler. The filter performs an anti-aliasing filtration on the selected signal to generate a filtration result, and the down sampler down-samples the filtration result by a third factor to generate the down sampled signal of a fourth clock rate.

Another embodiment is a digital device, comprising a digital microphone and the audio codec. The digital microphone is operable to generate a second digital signal from a voice input. The audio codec is coupled to the digital microphone and attachable to an analog microphone.

Furthermore, a voice processing method is provided based on the digital device. In a first process, a voice input is received through an analog microphone to generate an analog input signal. The analog input signal is then digitized to generate a first digital signal. The first digital signal is down sampled to generate a first intermediate signal. In a second process, the digital microphone receives the voice input to generate a second digital signal. The second digital signal is down sampled to generate a second intermediate signal. Either the first intermediate signal or the second intermediate signal is selected as a selected signal based on a control signal. The selected signal is down sampled to generate a down sampled signal, and the down sampled signal is formatted to produce a digital output signal. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
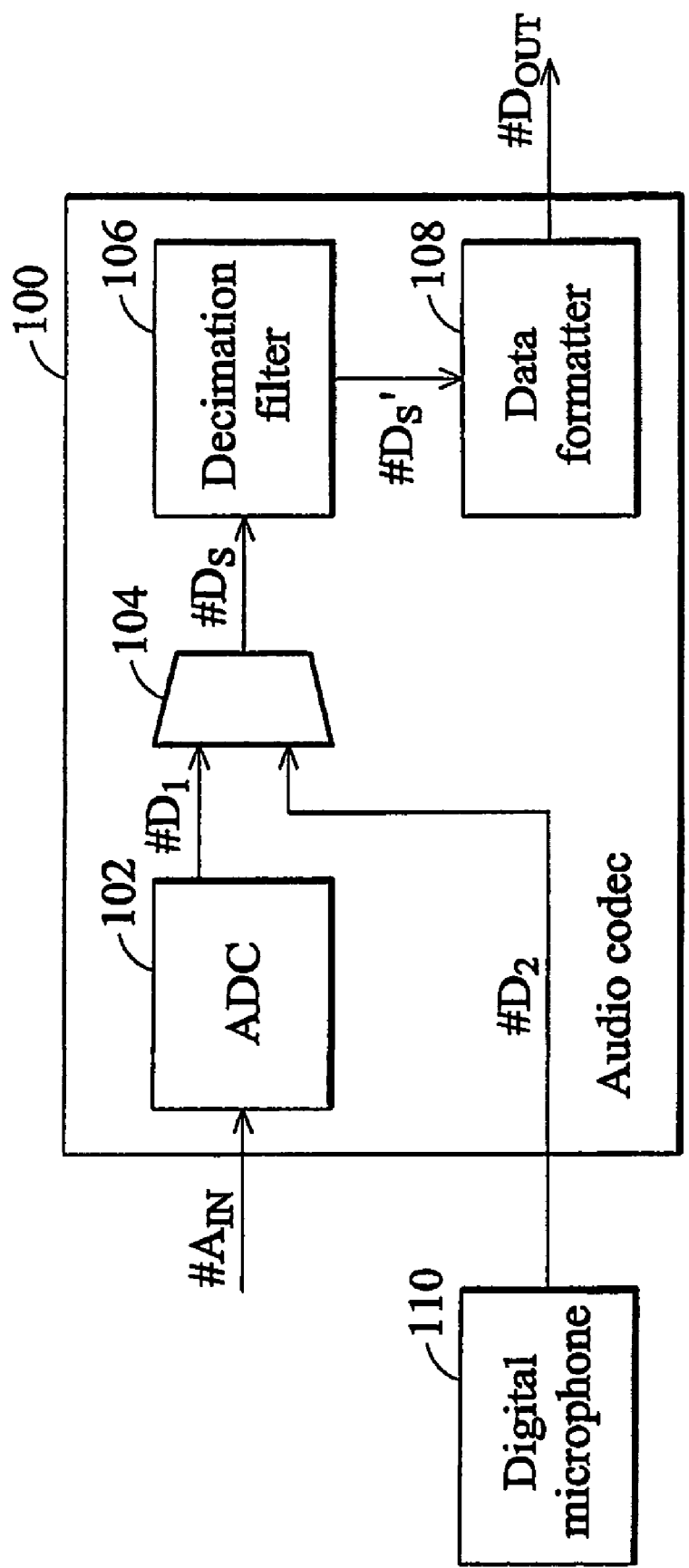
FIG. 1 shows a conventional audio codec 100.
Figure 2:
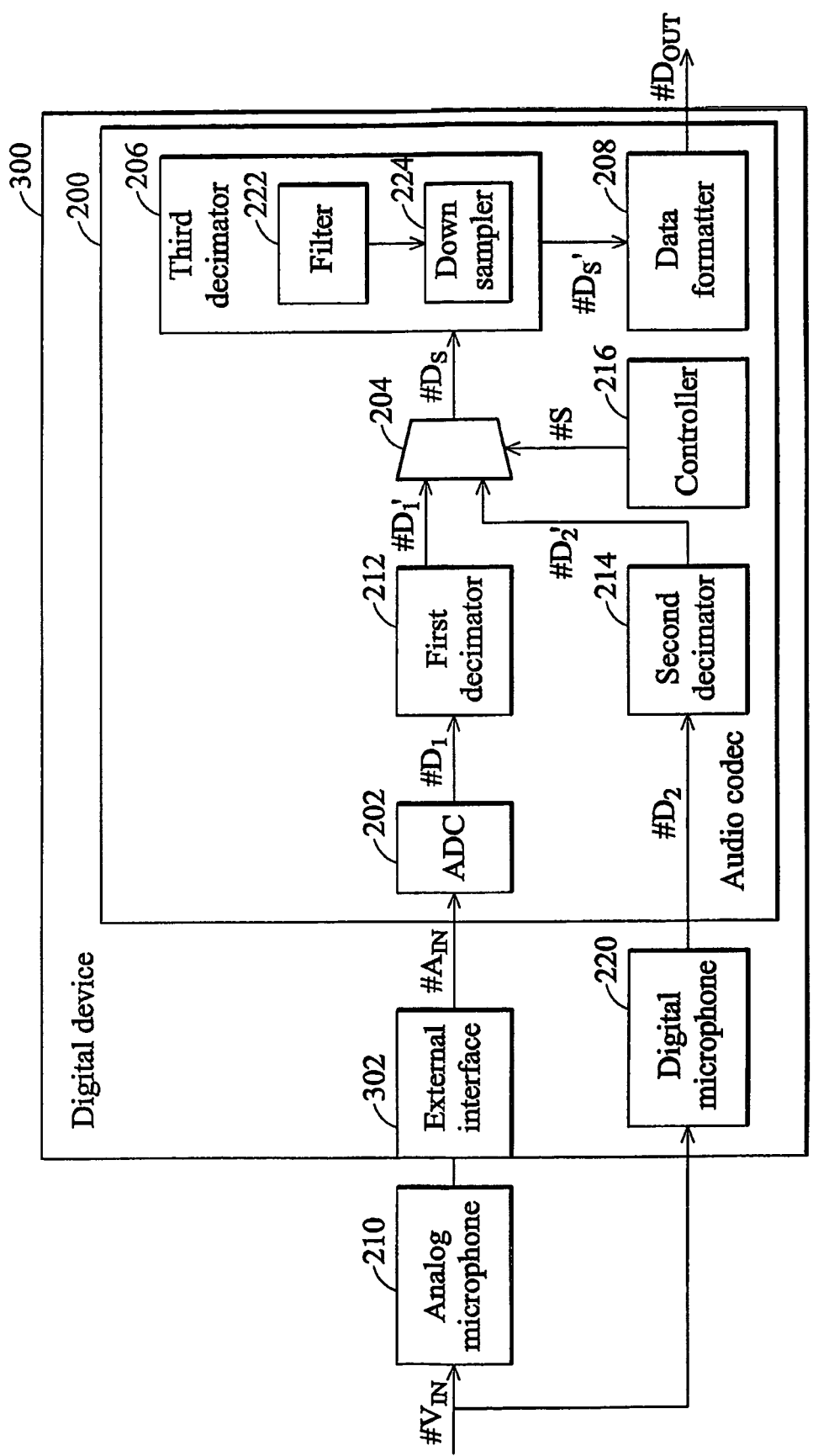
FIG. 2 shows an embodiment of an audio codec 200 implemented in a digital device 300.

The conventional architecture as described in FIG. 1 is a single-stage decimation system. In the embodiment, a dual-stage decimation system is implemented. FIG. 2 shows an embodiment of an audio codec 200 implemented in a digital device 300. The digital device 300 may be a portable digital device such as a mobile phone or a media player, comprising a digital microphone 220 for digitizing a voice input $\#V_{IN}$ into a second digital signal $\#D_2$. The digital device 300 may also comprise an external interface 302 for attachment to an analog microphone 210, providing an alternative path for reception of the voice input $\#V_{IN}$. Therefore, the audio codec 200 can simultaneously receive an analog input signal $\#A_{IN}$ generated by the analog microphone 210 and the second digital signal $\#D_2$ generated by the digital microphone 220, and a digital output signal $\#D_{OUT}$ is generated based thereupon.

In the audio codec 200, an ADC 202 receives the analog input signal $\#A_{IN}$ to generate a first digital signal $\#D_1$. In the embodiment, flexibility is provided because various clock rates and signal formats are supported. The ADC 202 is not limited to be a one-bit delta-sigma modulator that converts the analog input signal $\#A_{IN}$ into a one-bit Pulse Code Modulation (PCM) data stream. Alternatively, the ADC 202 may be a multi-bit delta-sigma modulator, such as a second order delta sigma modulator with a 3-bit quantizer operating at a predetermined clock rate. Consequently, the first digital signal $\#D_1$ output therefrom may also be a multi-bit PCM data stream of the predetermined clock rate. The bit-width and the predetermined clock rate are application dependent. For example, the predetermined clock rate may be 1.024 MHz for an 8 Khz narrow band communication application, or 3.072 MHz for a 48 KHz audio recording. A higher clock rate such as 6.144 MHz is also allowable, and the invention is not limited thereto. The bit-width of the first digital signal $\#D_1$ may range from 1-bit to 6-bit.

Regarding the second digital signal $\#D_2$, the digital microphone 220 typically comprises a diaphragm, a back plate, a preamplifier and an embedded ADC (not shown), and the second digital signal $\#D_2$ output therefrom can be a one-bit data stream following the Pulse Density Modulation (PDM) standard. The clock rate of second digital signal $\#D_2$ is not limited to be identical to that of the first digital signal $\#D_1$, and is application dependent.

In the embodiment, the audio codec 200 is a dual decimation architecture, whereby the first digital signal $\#D_1$ and second digital signal $\#D_2$ are down sampled in two stages. The advantage of the dual decimation architecture is the benefit from power consumption reduction and area efficiency improvements. Furthermore, the final result would benefit from better Signal to Noise ratio because the additional decimation stage functions as an equivalent shaping filter. A first decimator 212 and a second decimator 214 implement the first stage, respectively, and a third decimator 206 implements the second stage. The first decimator 212 is coupled to the ADC 202, down sampling the first digital signal $\#D_1$ to generate a first intermediate signal $\#D'_1$, and the second decimator 214 receives the second digital signal $\#D_2$ from the digital microphone 220 and down samples the second digital signal $\#D_2$ to generate a second intermediate signal $\#D'_2$. The first intermediate signal $\#D'_1$ and the second intermediate signal $\#D'_2$ are designated to be of the same clock rate and bit-width, such as 192 KHz and 18 bits. Since the clock rates of first digital signal $\#D_1$ and second digital signal $\#D_2$ are not necessarily identical, the first decimator 212 and second decimator 214 may adapt different down sample factors to render down sample results (first intermediate signal $\#D'_1$ and second intermediate signal $\#D'_2$) of the same clock rates. For example, if the first digital signal $\#D_1$ is 6.144 MHz, the first decimator 212 may divide the frequency of the first digital signal $\#D_1$ by 32 to render the first intermediate signal $\#D'_1$ of 192 KHz. Meanwhile, the second digital signal $\#D_2$ may be 3.072 MHz, so in this example the second decimator 214 would divide the frequency of the second digital signal $\#D_2$ by 16 to render the second intermediate signal $\#D'_2$ of the same frequency, 192 KHz. In the embodiment, the first decimator 212 and second decimator 214 are sinc type decimators implementing multi-order sync filtrations, in which the high frequency components are filtered out while the low frequency components are down sampled.

The first intermediate signal $\#D'_1$ and the second intermediate signal $\#D'_2$ are selected by a multiplexer 204 to be output as a selected signal $\#D_S$ based on a control signal $\#S$. The control signal $\#S$ may be a user customized value or an auto determined value. For example, a controller 216 is provided to determine the control signal $\#S$ based on availability of the analog input signal $\#A_{IN}$. When the analog microphone 210 is not attached to the digital device 300, the default selection is the second intermediate signal $\#D'_2$. When the analog microphone 210 is attached to the digital device 300, the controller 216 may automatically switch to output the first intermediate signal $\#D'_1$ as the selected signal $\#D_S$.

Thereafter, a third decimator 206 is coupled to the multiplexer 204 for down sampling the selected signal $\#D_S$ to generate a down sampled signal $\#D'_S$. In the embodiment, the third decimator 206 comprises a filter 222 and a down sampler 224. The filter 222 may be a half band filter, a droop compensation filter, a DC remove high pass filter or other filter capable of performing an anti-aliasing filtration on the selected signal $\#D_S$ to eliminate out-of-band components therein. The down sampler 224 then down-samples the filtration result of filter 222 to generate the down sampled signal $\#D'_S$. For example, the clock rate of the selected signal $\#D_S$ may be 192 KHz, and the down sampler 224 may divide the clock rate by 6 to render a down sampled signal $\#D'_S$ of 48 KHz, or divide by 8 to render a down sampled signal $\#D'_S$ of 32 KHz.

A data formatter 208 is coupled to the down sampled signal $\#D'_S$ for producing a digital output signal $\#D_{OUT}$. As an example, the digital output signal $\#D_{OUT}$ may be a 16-bit Inter-IC Sound (I2S) signal. The data formatter 208 is also programmable to output other data formats such as a 24-bit pulse code modulated (PCM) signal or 20-bit PCM signals when required.

Figure 3:
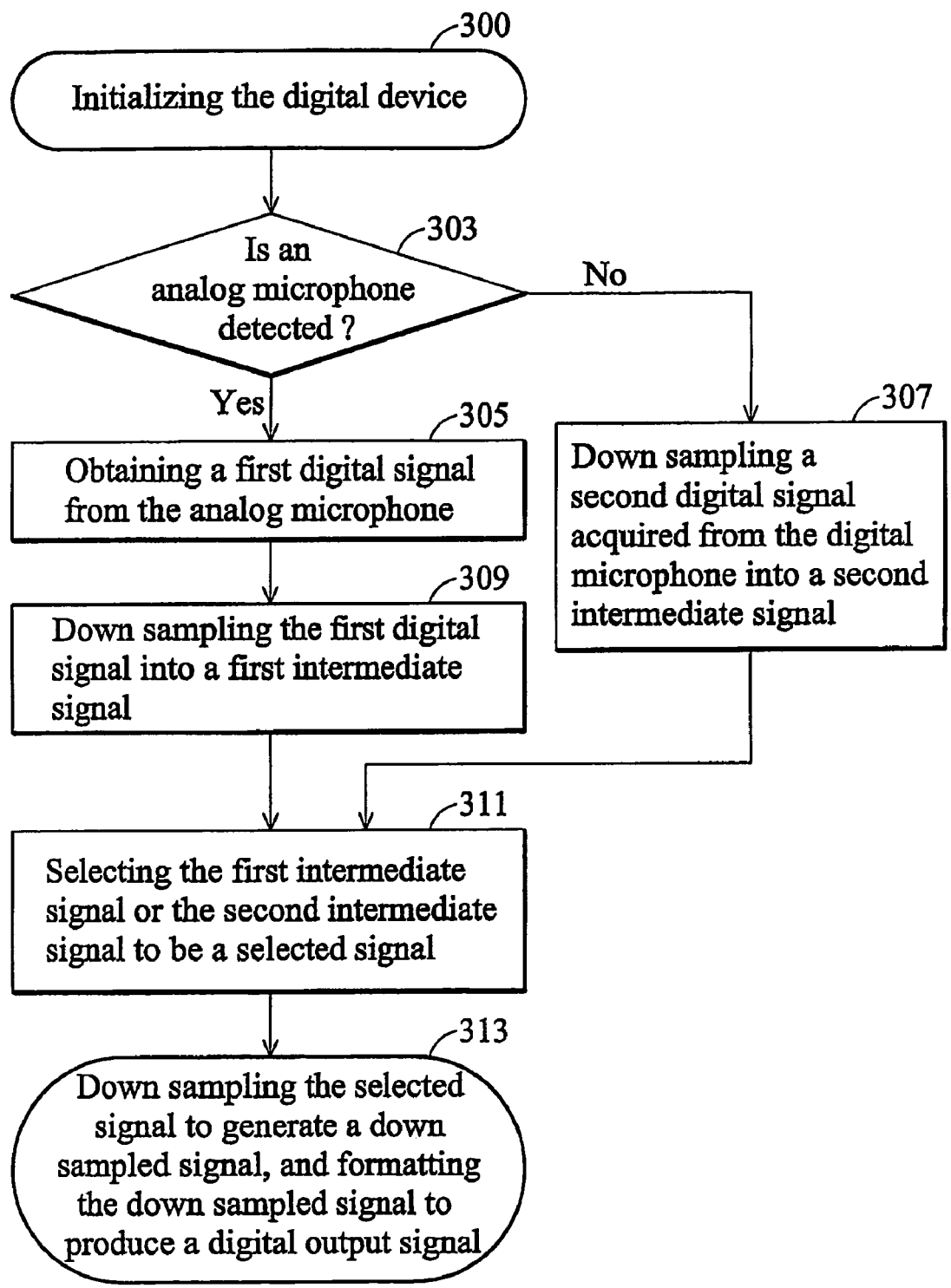
FIG. 3 is a flowchart of a voice processing method according to an embodiment of the invention.

FIG. 3 is a flowchart of a voice processing method based on the digital device 300. The digital device 300 is initialized in step 301. In step 303, the digital device 300 detects whether an analog microphone 210 is attached to the digital device 300. If the analog microphone 210 is detected, step 305 is processed to receive the voice input $\#V_{IN}$ via the analog microphone 210. Otherwise, step 307 is processed to receive the voice input $\#V_{IN}$ via the digital microphone 220. In step 305, the voice input $\#V_{IN}$ is converted to an analog input signal $\#A_{IN}$ through the analog microphone 210, and the ADC 202 digitizes the analog input signal $\#A_{IN}$ to generate a first digital signal $\#D_1$. Step 309 follows step 305, performing a sync type filtration to down sample the first digital signal $\#D_1$ into a first intermediate signal $\#D'_1$. In step 307, the digital microphone 220 receives the voice input #$V_{IN}$ to generate a second digital signal #$D_2$, and the second decimator 214 down samples the second digital signal #$D_2$ to generate a second intermediate signal #$D'_2$. In step 311, either the first intermediate signal #$D'_1$ or the second intermediate signal #$D'_2$ is selected to be a selected signal #$D_S$ based on the detection result in step 303. Thereafter, in step 313, the third decimator 206 down samples the selected signal #$D_S$ to generate a down sampled signal #$D'_S$, and the data formatter 208 performs data formation on the down sampled signal #$D'_S$ to produce a digital output signal #$D_{OUT}$.

In the embodiment, the ADC 202 supports a multi-bit data stream, such that the idle tone effect can be reduced by 12 db in comparison to a one-bit data stream. Furthermore, the maximum allowable input amplitude of a multi-bit type ADC 202 is 6 dB higher than that of a one-bit type, and the signal to quantization noise ratio can be improved by increasing the data rate of the ADC 202. The dual decimation architecture in the audio codec 200 allows the third decimator 206 to be shared by both the analog microphone 210 and the digital microphone 220. Since the implementations of the first decimator 212 and second decimator 214 occupy only a small chip size area in comparison to the third decimator 206, the invention achieves a cost effective codec solution.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio codec, comprising:
  an analog to digital converter (ADC), operable to receive an analog input signal for producing a first digital signal;
  a first decimator, coupled to the ADC for down sampling the first digital signal to generate a first intermediate signal;
  a second decimator, operable to receive a second digital signal from a digital microphone and down sample the second digital signal to generate a second intermediate signal;
  a multiplexer, coupled to the first decimator and the second decimator, selecting either the first intermediate signal or the second intermediate signal as a selected signal based on a control signal;
  a third decimator, coupled to the multiplexer for down sampling the selected signal to generate a down sampled signal;
  a data formatter, coupled to the down sampled signal for producing a digital output signal.

2. The audio codec as claimed in claim 1, further comprising a controller for providing the control signal based on availability of the analog input signal.

3. The audio codec as claimed in claim 1, wherein the ADC is a one-bit delta-sigma modulator that converts the analog input signal into the first digital signal, which is a one-bit Pulse Code Modulation (PCM) data stream of a first clock rate.

4. The audio codec as claimed in claim 1, wherein the ADC is a multi-bit delta-sigma modulator that converts the analog input signal into the first digital signal, which is a multi-bit PCM data stream of a first clock rate.

5. The audio codec as claimed in claim 4, wherein the first decimator is a sinc type decimator that down samples the first digital signal by a first factor to generate the first intermediate signal of a second clock rate.

6. The audio codec as claimed in claim 5, wherein the second digital signal is a one-bit Pulse Density Modulated (PDM) data stream of a third clock rate.

7. The audio codec as claimed in claim 6, wherein the second decimator is a sinc type decimator that down samples the second digital signal by a second factor to generate the second intermediate signal of the second clock rate.

8. The audio codec as claimed in claim 1, wherein the third decimator comprises:
  a filter, for performing an anti-aliasing filtration on the selected signal to generate a filtration result; and
  a down sampler, coupled to the filter, down-sampling the filtration result by a third factor to generate the down sampled signal of a fourth clock rate.

9. A digital device, comprising:
  a digital microphone, for generating a second digital signal from a voice input;
  an audio codec, coupled to the digital microphone and attachable to an analog microphone, comprising:
    an ADC, for receiving an analog input signal from the analog microphone to produce a first digital signal;
    a first decimator, coupled to the ADC for down sampling the first digital signal to generate a first intermediate signal;
    a second decimator, coupled to the digital microphone, for down sampling the second digital signal to generate a second intermediate signal;
    a multiplexer, coupled to the first decimator and the second decimator, selecting either the first intermediate signal or the second intermediate signal as a selected signal based on a control signal;
    a third decimator, coupled to the multiplexer, down sampling the selected signal to generate a down sampled signal;
    a data formatter, coupled to the down sampled signal for producing a digital output signal.

10. The digital device as claimed in claim 9, wherein the audio codec further comprises a controller for providing the control signal based on connectivity of the analog microphone.

11. The digital device as claimed in claim 9, wherein the ADC is a one-bit delta-sigma modulator that converts the analog input signal into the first digital signal, which is a one-bit PCM data stream of a first clock rate.

12. The digital device as claimed in claim 9, wherein the ADC is a multi-bit delta-sigma modulator that converts the analog input signal into the first digital signal, which is a multi-bit PCM data stream of a first clock rate.

13. The digital device as claimed in claim 12, wherein the first decimator is a sinc type decimator that down samples the first digital signal by a first factor to generate the first intermediate signal of a second clock rate.

14. The digital device as claimed in claim 13, wherein the second digital signal is a one-bit PDM data stream of a third clock rate.

15. The audio codec as claimed in claim 14, wherein the second decimator is a sinc type decimator that down samples the second digital signal by a second factor to generate the second intermediate signal of the second clock rate.

16. The digital device as claimed in claim 9, wherein the third decimator comprises:
  a filter, for performing an anti-aliasing filtration on the selected signal to generate a filtration result; and a down sampler, coupled to the filter, down-sampling the filtration result by a third factor to generate the down sampled signal of a fourth clock rate.

17. A voice processing method for a digital device comprising a digital microphone, comprising:
performing an first process comprising:
- receiving a voice input through an analog microphone to generate an analog input signal;
- digitizing the analog input signal to generate a first digital signal;
- down sampling the first digital signal to generate a first intermediate signal;

performing a second process comprising:
- the digital microphone receiving the voice input to generate a second digital signal;
- down sampling the second digital signal to generate a second intermediate signal;

selecting either the first intermediate signal or the second intermediate signal as a selected signal based on a control signal;
down sampling the selected signal to generate a down sampled signal;
performing data formation on the down sampled signal to produce a digital output signal.

18. The voice processing method as claimed in claim 17, further comprising:
detecting whether the analog microphone is attached to the digital device; wherein:
the first process is performed only when the analog microphone is attached to the digital device; and
the control signal is determined based on the connectivity between the analog microphone and the digital device.

19. The voice processing method as claimed in claim 17, wherein the digitization of analog input signal comprises performing a one-bit delta-sigma modulation on the analog input signal to generate the first digital signal, which is a one-bit PCM data stream of a first clock rate.

20. The voice processing method as claimed in claim 17, wherein the digitization of analog input signal comprises performing a multi-bit delta-sigma modulation on the analog input signal to generate the first digital signal, which is a multi-bit PCM data stream of a first clock rate.

21. The voice processing method as claimed in claim 20, wherein down sampling of the first digital signal comprises performing a sinc type decimation to divide the first clock rate by a first factor to generate the first intermediate signal of a second clock rate.

22. The voice processing method as claimed in claim 21, wherein the second digital signal is a one-bit PDM data stream of a third clock rate.

23. The voice processing method as claimed in claim 22, wherein down sampling of the second digital signal comprises performing a sinc type decimation to divide the third clock rate by a second factor to generate the second intermediate signal of the second clock rate.

24. The voice processing method as claimed in claim 17, wherein down sampling of the selected signal comprises:
performing an anti-aliasing filtration on the selected signal to generate a filtration result; and
down-sampling the filtration result by a third factor to generate the down sampled signal of a fourth clock rate.

* * * * *